(12) United States Patent
Kishimoto

(10) Patent No.: US 9,853,282 B2
(45) Date of Patent: Dec. 26, 2017

(54) ELECTRODE PASTE PRODUCTION METHOD

(71) Applicant: TOYOTA JIDOSHA KABUSHIKI KAISHA, Toyota-shi, Aichi-ken (JP)

(72) Inventor: Naoya Kishimoto, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 118 days.

(21) Appl. No.: 14/889,514

(22) PCT Filed: May 16, 2013

(86) PCT No.: PCT/JP2013/063660
§ 371 (c)(1),
(2) Date: Nov. 6, 2015

(87) PCT Pub. No.: WO2014/184925
PCT Pub. Date: Nov. 20, 2014

(65) Prior Publication Data
US 2016/0099461 A1   Apr. 7, 2016

(51) Int. Cl.
| | | |
|---|---|---|
| *H01M 4/13* | (2010.01) | |
| *H01M 4/131* | (2010.01) | |
| *H01M 4/04* | (2006.01) | |
| *H01M 4/1391* | (2010.01) | |
| *H01M 4/505* | (2010.01) | |
| *H01M 4/525* | (2010.01) | |
| *H01M 10/0525* | (2010.01) | |
| *H01M 4/62* | (2006.01) | |
| *H01M 4/02* | (2006.01) | |

(52) U.S. Cl.
CPC ............ *H01M 4/131* (2013.01); *H01M 4/04* (2013.01); *H01M 4/0404* (2013.01); *H01M 4/1391* (2013.01); *H01M 4/505* (2013.01); *H01M 4/525* (2013.01); *H01M 4/0411* (2013.01); *H01M 4/62* (2013.01); *H01M 10/0525* (2013.01); *H01M 2004/028* (2013.01)

(58) Field of Classification Search
CPC ...................................................... H01M 4/131
USPC .................................................. 429/223, 224
See application file for complete search history.

(56) References Cited

U.S. PATENT DOCUMENTS

| | | | |
|---|---|---|---|
| 6,497,979 B1 | 12/2002 | Iijima et al. | |
| 2005/0158546 A1* | 7/2005 | Shizuka | .............. H01M 4/0404 428/402 |
| 2006/0240314 A1* | 10/2006 | Song | ................... H01M 4/8621 429/482 |
| 2011/0177364 A1 | 7/2011 | Miyazaki et al. | |
| 2016/0248076 A1* | 8/2016 | Sugihara | ............ B01D 19/0036 |

FOREIGN PATENT DOCUMENTS

| | | |
|---|---|---|
| CN | 1256014 A | 6/2000 |
| CN | 102064314 A | 5/2011 |
| JP | 11-45706 A | 2/1999 |
| JP | 2002-303955 A | 10/2002 |
| JP | 2003-308842 A | 10/2003 |
| JP | 2004-113968 A | 4/2004 |
| JP | 2011-150873 A | 8/2011 |
| JP | 2012-252810 A | 12/2012 |
| JP | 2013-37946 A | 2/2013 |

\* cited by examiner

*Primary Examiner* — David Sorkin
(74) *Attorney, Agent, or Firm* — Sughrue Mion, PLLC

(57) ABSTRACT

Provided is an electrode paste production method that can produce a low-viscosity electrode paste which can be readily applied even if the solid content concentration is high, for example in excess of 65% by mass. The electrode paste production method, in which the paste contains an active material and a solvent, includes a micromixing treatment step in which a mixture of a solid fraction containing an active material blended at a high solid content concentration and a solvent is kneaded using a micromixer.

4 Claims, 6 Drawing Sheets

ELECTRODE PASTE PRODUCTION METHOD

CROSS REFERENCE TO RELATED APPLICATIONS

This application is a National Stage of International Application No. PCT/JP2013/063660 filed May 16, 2013, the contents of which are incorporated herein by reference in their entirety.

TECHNICAL FIELD

The present invention relates to a production method for an electrode paste that can be used in the production of electrodes and the like of lithium ion secondary batteries and the like.

BACKGROUND ART

In recent years, rechargeable lithium ion secondary batteries have become widely used as the power sources for driving vehicles including hybrid vehicles and electric vehicles, and portable electronic equipment such as notebook computers.

Lithium ion secondary batteries comprise, for example, a positive electrode plate having a positive electrode active material layer containing a positive electrode active material such as a lithium oxide that is capable of lithium insertion and removal, a binder and a conductive assistant formed on a positive electrode current collector, a negative electrode plate having a negative electrode active material layer containing a negative electrode active material such as a carbon material that is capable of lithium occlusion and release and a binder formed on a negative electrode current collector, and a non-aqueous electrolyte.

The positive electrode plate is obtained, for example, by coating the positive electrode current collector with a positive electrode paste containing the positive electrode active material, the binder, the conductive assistant and a solvent.

For example, Patent Document 1 discloses a production method for a positive electrode plate having a metal foil, and a positive electrode active material layer formed on this metal foil and containing positive electrode active material particles, a carbon-based conductive assistant and a binder, the production method comprising a positive electrode paste preparation step of preparing a positive electrode paste, and a coating step for coating the metal foil with this positive electrode paste, wherein during the positive electrode paste preparation step, the positive electrode paste is prepared with a solid content concentration selected from a range of 50 to 65 wt %, so that a set (x, y) of the value x for the mixed powder density of the mixed powder and the value y for the viscosity of the positive electrode paste falls within a prescribed region R on a semilogarithmic graph in which the horizontal axis represents the mixed powder density and the logarithmic scale vertical axis represents the viscosity of the positive electrode paste.

A higher solid content concentration for the electrode paste such as the positive electrode paste enables reductions in the drying time and the solvent volume when producing the electrode plate such as the positive electrode plate, and is consequently preferred. However, in those cases where the solid content concentration of the electrode paste is increased to a value that is higher than the level assumed in the prior art, such as a concentration exceeding 65% by mass, the viscosity of the electrode paste may sometimes become too high, making application of the paste with a coating device such as a die coater problematic. Accordingly, in the preparation of electrode pastes, there is still room for improvement from the viewpoint of further increasing the solid content concentration.

PRIOR ART DOCUMENTS

Patent Document

Patent Document 1: JP 2012-252810 A

SUMMARY OF THE INVENTION

Problems to be Solved by the Invention

An object of the present invention is to provide an electrode paste production method that enables the production of a low-viscosity electrode paste that can be readily applied even if the paste has a high solid content concentration such as a concentration exceeding 65% by mass.

Means for Solving the Problems

The present invention provides a production method for an electrode paste comprising an active material and a solvent, the production method comprising a micromixing treatment step in which a mixture of a solid fraction containing an active material blended at a high solid content concentration and a solvent is kneaded using a micromixer.

Further, in the above production method for an electrode paste, the shear energy in the mixing section of the micromixer is preferably within a range from not less than 4,000 kJ/L to not more than 16,000 kJ/L.

Further, in the above production method for an electrode paste, the solid content concentration of the mixture preferably exceeds 65% by mass.

Furthermore, the above production method for an electrode paste preferably comprises a coating treatment step of coating the active material with an additive prior to the micromixing treatment step.

Furthermore, in the above production method for an electrode paste, an additive is preferably also added and kneaded in the micromixing treatment step.

Moreover, in the above production method for an electrode paste, it is preferable that the active material comprises a lithium-nickel-manganese complex oxide, and that the electrode paste also comprises a substance having lithium ion conductivity as an additive.

Advantages of the Invention

According to the present invention, a low-viscosity electrode paste can be produced which can be readily applied even if the paste has a high solid content concentration such as a concentration exceeding 65% by mass.

EMBODIMENTS FOR CARRYING OUT THE INVENTION

Embodiments of the present invention are described below. These embodiments are merely examples of implementing the present invention, and the present invention is in no way limited by these embodiments.

<Electrode Paste Production Method>

An electrode paste production method according to an embodiment of the present invention is a production method for an electrode paste comprising an active material and a solvent, wherein the method comprises a micromixing treatment step in which a mixture of a solid fraction containing an active material blended at a high solid content concentration and a solvent is kneaded using a micromixer.

A micromixer is a kneading device in which, for example, a slurry is fed into a mixing section such as a nozzle portion by a high-pressure pump, and kneading can be performed under the action of the high shear energy (for example, a shear energy that is at least 500 kJ/L but not more than 16,000 kJ/L, preferably at least 4,000 kJ/L but not more than 16,000 kJ/L, and more preferably at least 8,000 kJ/L but not more than 16,000 kJ/L) that is generated as the slurry passes through the mixing section. In order to achieve satisfactory kneading, the diameter of the mixing section such as the nozzle portion is typically at a microscale level of not more than 1,000 μm, preferably from 30 μm to 100 μm, and more preferably from 50 μm to 100 μm. The micromixer is a device that is capable of mixing and emulsifying substances such as water and oil, and a specific example is the Nanovater device manufactured by Yoshida Kikai Co., Ltd.

If the shear energy in the micromixer is less than 500 kJ/L, then loosening the cohesion of the positive electrode active material and the like may become difficult, and the dispersion may sometimes be unsatisfactory, whereas if the shear energy exceeds 16,000 kJ/L, then the positive electrode active material may sometimes be converted to a very fine powder.

If the diameter of the mixing section such as the nozzle portion of the micromixer is less than 30 μm, then the mixing section may sometimes become blocked, whereas if the diameter exceeds 1,000 μm, then loosening the cohesion of the positive electrode active material and the like may become difficult, and the dispersion may sometimes be unsatisfactory.

Figure 1:
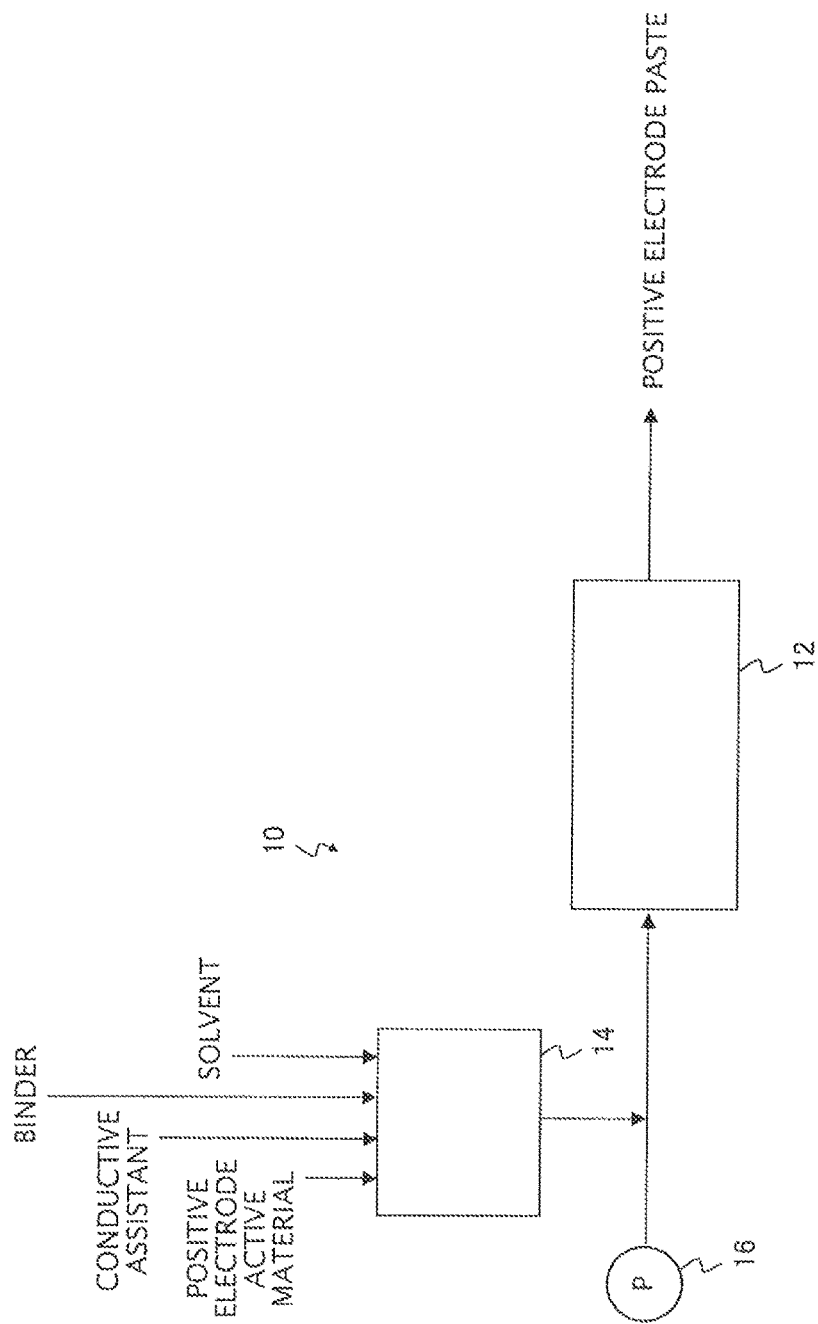
FIG. 1 is a schematic view illustrating one example of the electrode paste production method according to an embodiment of the present invention.

FIG. 1 illustrates one example of the electrode paste production method according to the present embodiment. As illustrated in FIG. 1, a mixture (mixed slurry) which is stored in a mixing tank 14 and is prepared by mixing a solid fraction containing an active material such as a positive electrode active material, a conductive assistant and a binder, with a solvent is fed into a mixing section such as the nozzle portion of a kneading unit 12 of a micromixer 10 by a pump 16, and the mixture is kneaded and dispersed by the high shear force generated as the mixture passes through the mixing section, thus obtaining an electrode paste such as a positive electrode paste (the micromixing treatment step).

In this description, the expression "high solid content concentration" refers to a case where, for example, the concentration of the solid content within the mixture exceeds 65% by mass, and preferably describes a concentration exceeding 69% by mass. The upper limit for the solid content concentration within the mixture is, for example, not more than 75% by mass. If the solid content concentration exceeds 75% by mass, then kneading and dispersion may sometimes become difficult.

In a battery production line, the electrode coating step in which an electrode paste is applied to a current collector and then dried to obtain an electrode plate has comparatively high equipment costs, and within the various equipment for the coating device, the equipment costs for the drying unit are comparatively high. In order to suppress these equipment costs, it is desirable that the oven length of the drying oven is shortened, and one conceivable approach involves reducing the amount of solvent in the electrode paste, namely increasing the solid content concentration within the electrode paste. However, if the solid content concentration of an electrode paste is increased in a conventional production method, then the viscosity of the electrode paste may increase dramatically, and may sometimes exceed the standard paste viscosity range for which coating is possible with a coating device such as a die coater.

In the electrode paste production method according to the present embodiment, by performing kneading using a micromixer, the kneading can be performed with a higher shear force than that obtainable in a conventional kneading device such as a twin-screw kneader, and therefore the cohesion of additives such as lithium phosphate and the positive electrode active material can be loosened, an electrode paste that has been dispersed substantially uniformly can be prepared, and the viscosity of the obtained electrode paste can be reduced. Accordingly, a low-viscosity electrode paste that satisfies the requirements for electrode coating can be prepared even when the solid content concentration is higher than that conventionally used, such as a high solid content concentration exceeding 65% by mass.

There are no particular limitations on the positive electrode active material, provided that it is capable of lithium insertion and removal, and examples include various lithium oxides, including layered oxides such as $LiCoO_2$, $LiNiO_2$, $LiMnO_2$, $LiCoNiO_2$ and $LiNiCoMnO_2$, spinel oxides such as $LiMn_2O_4$, and olivine oxides such as $LiFePO_4$.

Other favorable positive electrode active materials include lithium-nickel-manganese complex oxides which can be charged to about 5 V. Specific examples of lithium-nickel-manganese complex oxides include $LiNi_mMn_nO_p$ compounds such as $LiNi_{0.5}Mn_{1.5}O_4$. Some elemental substitution with Ti or Fe or the like is also possible.

There are no particular limitations on the conductive assistant, provided that it imparts conductivity, and examples include carbon-based conductive assistants such as acetylene black, ketchen black, furnace black, graphite and carbon fiber.

There are no particular limitations on the binder, provided that it can appropriately disperse the positive electrode active material and the like, and examples include fluororesins such as polyvinylidene fluoride (PVDF) and polytetrafluoroethylene (PTFE).

There are no particular limitations on the solvent, provided that it is capable of appropriately dispersing the solid matter such as the positive electrode active material, and one specific example is N-methyl-2-pyrrolidone (NMP).

Moreover, in order to achieve further improvements in the performance of lithium ion secondary batteries (such as higher energy density and higher output), various investigations have been conducted into increasing the voltage of batteries by changing the positive electrode material or the like. However, under high-voltage conditions, the electrolyte sometimes undergoes oxidative decomposition, causing a deterioration in the cycle characteristics of the battery. Suppressing this oxidative decomposition by forming a protective layer coating on the positive electrode active material has been investigated as one possible measure for countering this problem, but the fact that this protective layer coating causes an increase in the resistance and a resulting reduction in the output is a concern.

For example, JP 2003-308842 A discloses that when a lithium-nickel-manganese complex oxide such as $LiNi_{0.5}Mn_{1.5}O_4$ is used as a high-voltage positive electrode material, incorporating 0.5 to 5% of lithium phosphate in the positive electrode active material layer can suppress decomposition of the non-aqueous electrolyte and improve the charge and discharge efficiency.

With this technique, oxidative decomposition can be suppressed simply by adding and mixing lithium phosphate. In order to suppress decomposition of the electrolyte, 0.5 to 5% of lithium phosphate is deemed ideal, but although decomposition can be better suppressed as the amount of lithium phosphate added is increased (closer to 5%), in order to prevent any deterioration in output, it is necessary to limit the amount added to not more than 1%, and there is no effective means of achieving both properties.

It is thought that the reason for this phenomenon is that the added lithium phosphate does not adopt a uniformly dispersed state within the electrode, meaning that at least 1% of lithium phosphate is necessary to achieve the desired performance. For example, it is surmised that a portion of the added lithium phosphate exists in the form of aggregated lumps, which do not exist on the surface of the positive electrode active material, but are rather incorporated within the conductive material. The inventors of the present invention speculated that if the added lithium phosphate could be optimally arranged in the desired location, then decomposition could be suppressed with the minimum required amount of lithium phosphate, and they therefore conducted investigations based around the aforementioned micromixing treatment in which kneading was performed using a micromixer.

As a result, they discovered that, in the micromixing treatment step, a method in which a substance having lithium ion conductivity such as lithium phosphate was also added and kneaded as an additive was particularly desirable.

By performing the kneading treatment with a micromixer at a much higher shear force than that used conventionally, even in those cases when an additive such as lithium phosphate that can act as an electrolyte decomposition inhibitor is used, and a lithium-nickel-manganese complex oxide or the like is employed as the positive electrode active material, the additive such as lithium phosphate can be dispersed substantially uniformly within the electrode paste, and the additive can be distributed as uniformly as possible within the electrode. Accordingly, decomposition of the electrolyte can be suppressed while suppressing any increase in the resistance, and therefore a combination of suppression of output deterioration and suppression of electrolyte decomposition (suppression of deterioration in the capacity retention rate) can be achieved.

Figure 2:
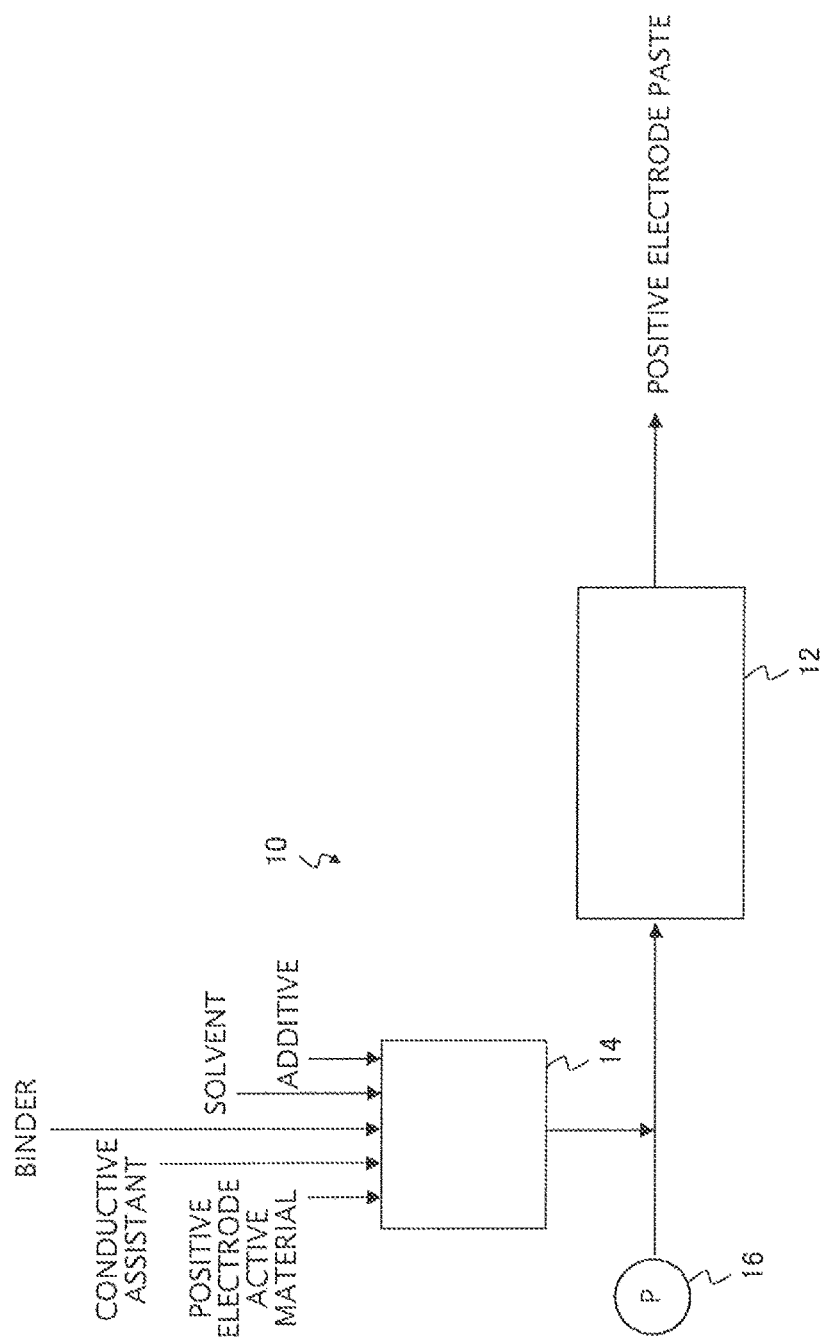
FIG. 2 is a schematic view illustrating another example of the electrode paste production method according to an embodiment of the present invention.

An outline of this method is illustrated in FIG. 2. As illustrated in FIG. 2, a mixture (mixed slurry) which is stored in the mixing tank 14 and is prepared by mixing a solid fraction containing an active material such as a positive electrode active material, a conductive assistant, a binder and an additive, with a solvent is fed into the mixing section such as the nozzle portion of the kneading unit 12 of the micromixer 10 by the pump 16, and the mixture is kneaded and dispersed by the high shear force generated as the mixture passes through the mixing section, thus obtaining an electrode paste such as a positive electrode paste (the micromixing treatment step).

An example of the additive is a substance having lithium ion conductivity such as lithium phosphate.

In this particular paste preparation method, the additive is not limited to lithium phosphate, and other substances having lithium ion conductivity that have a function such as the ability to suppress oxidative decomposition of the electrolyte may also be used. In such cases, the lithium ion conductivity of the additive is preferably at least $1.0 \times 10^{-7}$. If the lithium ion conductivity is less than $1.0 \times 10^{-7}$, then the resistance may sometimes increase, causing a reduction in the output.

The volume-average particle size D50v of the additive such as lithium phosphate is, for example, about 0.01 μm to 5 μm, and is preferably about 0.1 μm to 3 μm. If the volume-average particle size D50v of the additive such as lithium phosphate is less than 0.01 μm, then the additive may sometimes aggregate, whereas if the average particle size D50v exceeds 5 μm, then achieving substantially uniform distribution of the additive may become difficult.

Further, the electrode paste production method according to the present embodiment may include a coating treatment step of coating the active material with an additive prior to the micromixing treatment step.

A larger coating amount of lithium phosphate enables better suppression of decomposition of the electrolyte, but if the amount is 5% by mass or greater, then because the amount of the active material is reduced, the capacity may decrease, and therefore the coating amount is preferably not more than 5% by mass. However, if the coating amount is about 5% by mass, then the resistance value can increase to about 9 times that of an uncoated electrode, which can sometimes cause a reduction in the battery output.

In the method of the present invention, the arrangement of the additive such as lithium phosphate can be controlled by factors other than the dispersion force, and therefore at least a portion of the additive such as lithium phosphate may be coated (conjugated) in advance on the active material such as the positive electrode active material, with the additive functioning as a protective layer for the active material.

Figure 3:
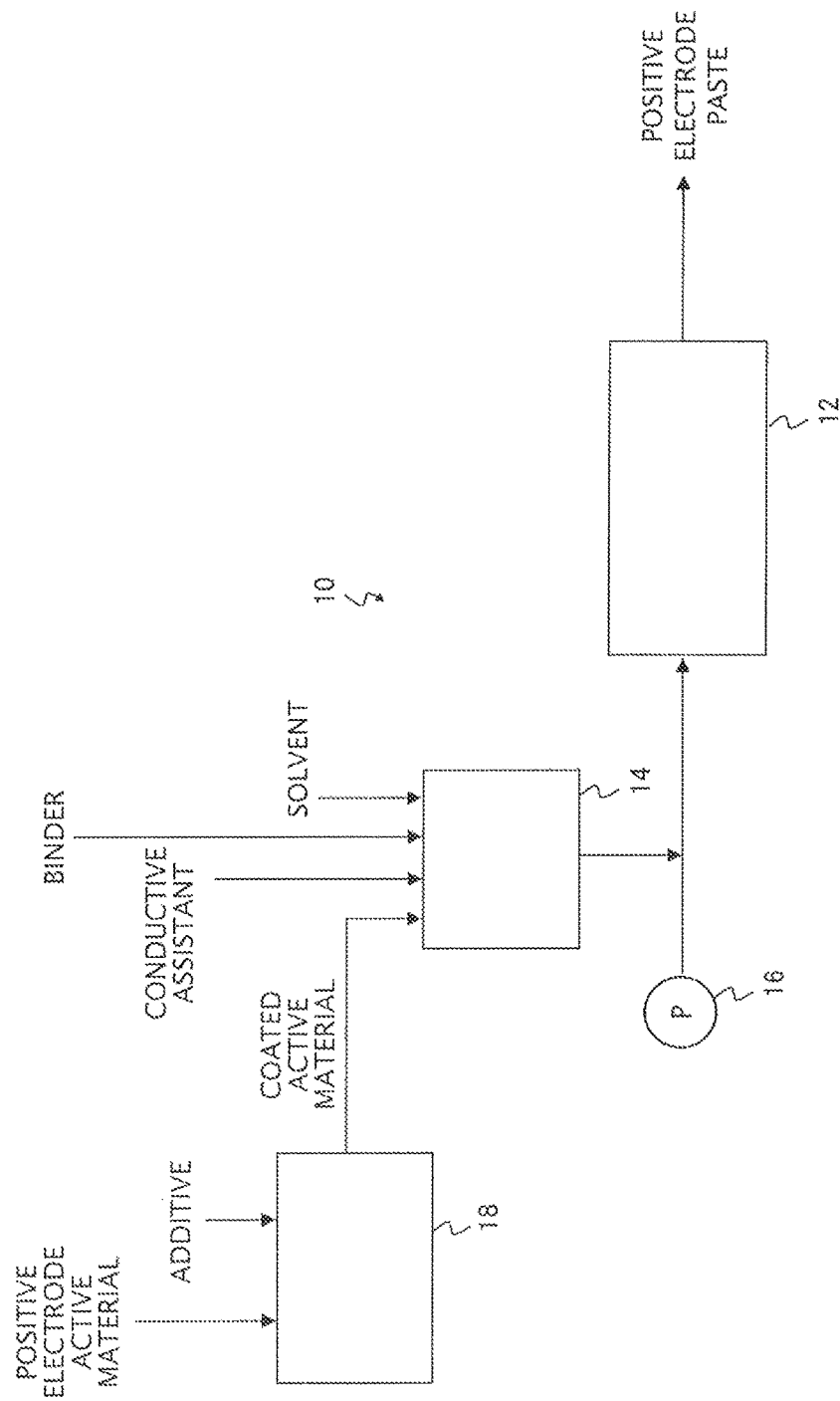
FIG. 3 is a schematic view illustrating yet another example of the electrode paste production method according to an embodiment of the present invention.

An outline of this method is illustrated in FIG. 3. As illustrated in FIG. 3, an additive is coated onto the surface of the active material such as the positive electrode active material by a coating treatment device 18 in a stage prior to the micromixing treatment step, thus obtaining a coated active material (the coating treatment step). Then, a mixture (mixed slurry) which is stored in the mixing tank 14 and is prepared by mixing a solid fraction containing the coated active material, a conductive assistant and a binder, with a solvent is fed into the mixing section such as the nozzle portion of the kneading unit 12 of the micromixer 10 by the pump 16, and the mixture is kneaded and dispersed by the high shear force generated as the mixture passes through the mixing section, thus obtaining an electrode paste such as a positive electrode paste (the micromixing treatment step).

By performing the coating treatment in which an additive is coated onto the surface of the active material prior to the micromixing treatment step, oxidative decomposition of the electrolyte can be better suppressed, and the battery performance including the capacity retention rate can be further improved.

The coating treatment step is conducted, for example, by performing conjugation via a mechanochemical method or the like in which a solid substance is pulverized, and the high energy that is generated locally due to the mechanical energy from friction and collisions and the like is used to initiate a chemical reaction such as a crystallization reaction, a solid solution reaction or a phase rearrangement reaction. Examples of the coating treatment device 18 used in the coating treatment include powder treatment devices such as a Nobilta device manufactured by Hosokawa Micron Corporation.

Further, in the electrode paste production method according to the present embodiment, an additive may also be added and kneaded in the micromixing treatment step.

Figure 4:
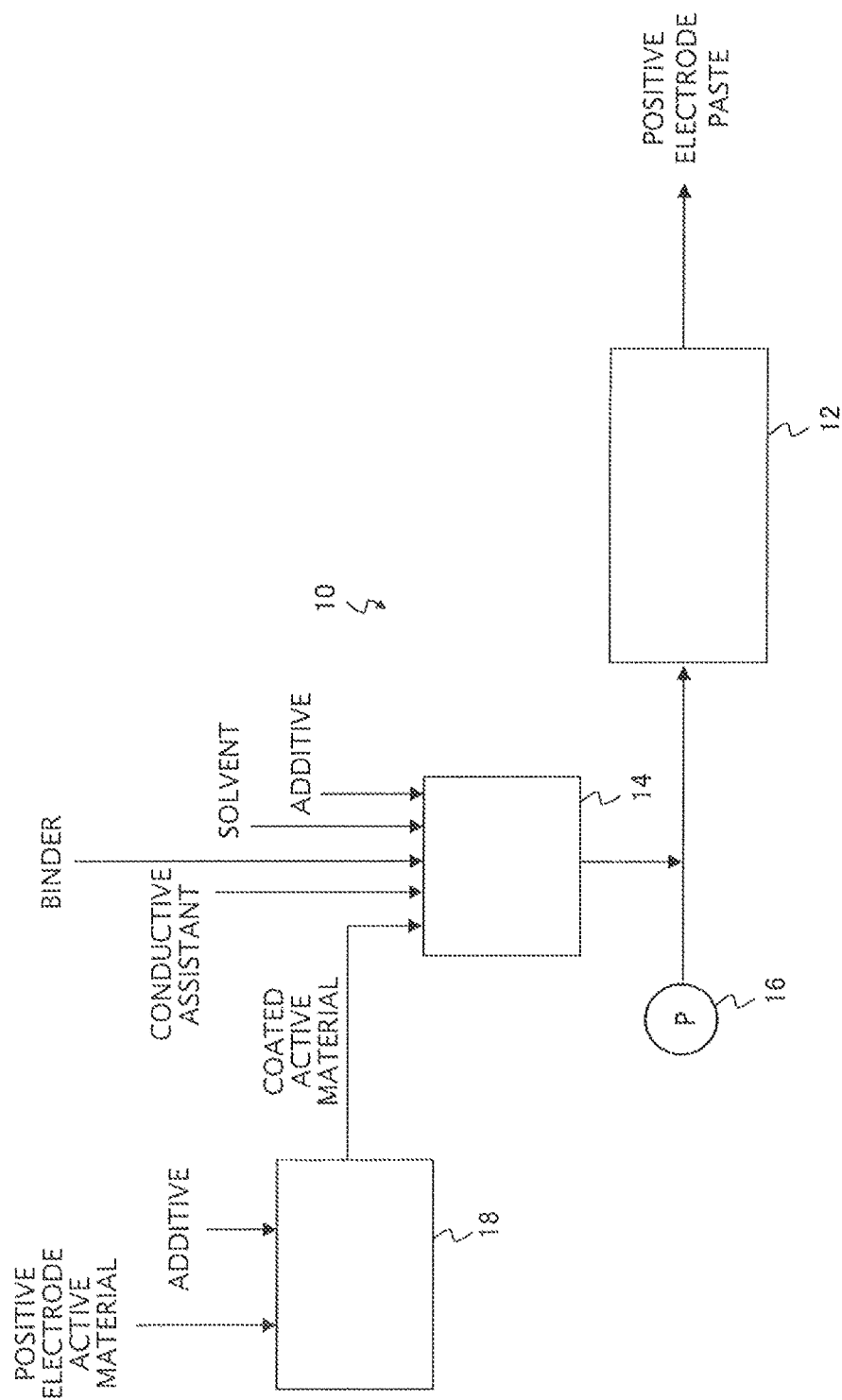
FIG. 4 is a schematic view illustrating yet another example of the electrode paste production method according to an embodiment of the present invention.

An outline of this method is illustrated in FIG. 4. As illustrated in FIG. 4, an additive is coated onto the surface of the active material such as the positive electrode active material by the coating treatment device 18 in a stage prior to the micromixing treatment step, thus obtaining a coated active material (the coating treatment step). Then, a mixture (mixed slurry) which is stored in the mixing tank 14 and is prepared by mixing a solid fraction containing the coated active material, a conductive assistant, a binder and an additive, with a solvent is fed into the mixing section such as the nozzle portion of the kneading unit 12 of the micromixer 10 by the pump 16, and the mixture is kneaded and dispersed by the high shear force generated as the mixture passes through the mixing section, thus obtaining an electrode paste such as a positive electrode paste (the micromixing treatment step).

In the electrode paste production method according to this embodiment, decomposition of the electrolyte can be suppressed even with a small coating amount. Among the electrode preparation steps that include lithium phosphate, by reducing the coating amount, and adding a portion of the lithium phosphate in a later step and then performing a high dispersion treatment, the amount of lithium phosphate can be reduced. With this method, oxidative decomposition of the electrolyte can be suppressed even when the preferred design value for the coating amount is reduced in order to lower the resistance.

In this manner, by performing the kneading treatment with a micromixer at a much higher shear force than that used conventionally, the additive can be dispersed more uniformly within the electrode paste. Further, in those cases where a coating treatment is performed, it is thought that by dividing the kneading with the additive into at least two stages, namely during the coating treatment step and during the micromixing treatment step, the additive can be dispersed with a good balance between the active material surface and the active material interior.

The amount added of the additive such as lithium phosphate is, for example, within a range from 0.1% by mass to 1% by mass relative to the total solid content. Further, when it is desirable to further improve the capacity retention rate; the amount added may be increased to 1% by mass or greater, for example an amount within a range from 3% by mass to 5% by mass. In such a case, if the production method described above is used, then an increase in the output of close to 20% can be expected.

<Positive Electrode Plate, Negative Electrode Plate, and Lithium Ion Secondary Battery>

By coating an electrode paste such as a positive electrode paste containing an active material such as a positive electrode active material and a solvent onto a current collector such as a positive electrode current collector by die coating or the like, a positive electrode plate comprising a positive electrode active material layer formed on the positive electrode current collector can be obtained.

There are no particular limitations on the positive electrode current collector, and examples include metal foils such as aluminum foil.

For example, by winding a positive electrode plate with an annular shape or the like prepared in the manner described above together with a negative electrode plate with an annular shape or the like and a separator with an annular shape or the like, an electrode body can be obtained. Moreover, a positive electrode current collecting member and a negative electrode current collecting member are welded to the positive electrode plate and the negative electrode plate respectively. Subsequently, the electrode body is housed inside a battery case main body, and the battery case main body is then sealed by welding a sealing lid to the battery case main body. A battery can then be obtained by injecting the electrolyte into the battery case main body through an injection hole, and then sealing the injection hole.

Examples of the negative electrode plate include structures in which a negative electrode active material layer comprising a negative electrode active material such as graphite and a binder such as polyvinylidene fluoride (PVDF) has been formed on a negative electrode current collector such as a copper foil.

The negative electrode paste for obtaining this negative electrode plate may be prepared by an electrode paste production method comprising the micromixing treatment step described above.

Examples of the electrolyte include electrolytes of excellent oxidation resistance obtained by adding a solute such as $LiPF_6$ to a mixed organic solvent containing ethylene carbonate (EC) and ethyl methyl carbonate (EMC).

Examples of the separator include porous polyethylene and the like.

A lithium ion secondary battery produced using an electrode paste obtained by the electrode paste production method according to the present embodiment can be used, for example, as the power source for driving a vehicle such as a hybrid vehicle or an electric vehicle, or portable electronic equipment such as a notebook computer.

EXAMPLES

The present invention is described below in further detail using a series of examples and comparative examples, but the present invention is in no way limited by the following examples.

Example 1

In the manner illustrated in FIG. 2, a mixture (solid content concentration: 70% by mass) obtained by mixing a solid fraction containing 90 parts by mass of a lithium-nickel-manganese complex oxide ($LiNi_{0.5}Mn_{1.5}O_4$) as a positive electrode active material, 6 parts by mass of acetylene black as a conductive assistant, 3 parts by mass of polyvinylidene fluoride (PVDF) as a binder and 1 part by mass of lithium phosphate (volume-average particle size D50v=3 μm) as an additive, with N-methyl-2-pyrrolidone (NMP) as a solvent was kneaded and dispersed by a high shear energy (8,000 kJ/L) using a micromixer (Nanovater, manufactured by Yoshida Kikai Co., Ltd.), thus obtaining a positive electrode paste (the micromixing treatment step).

Using the thus obtained paste, a positive electrode active material layer was formed on an aluminum foil using a die coating method, thus obtaining a positive electrode plate.

Figure 5:
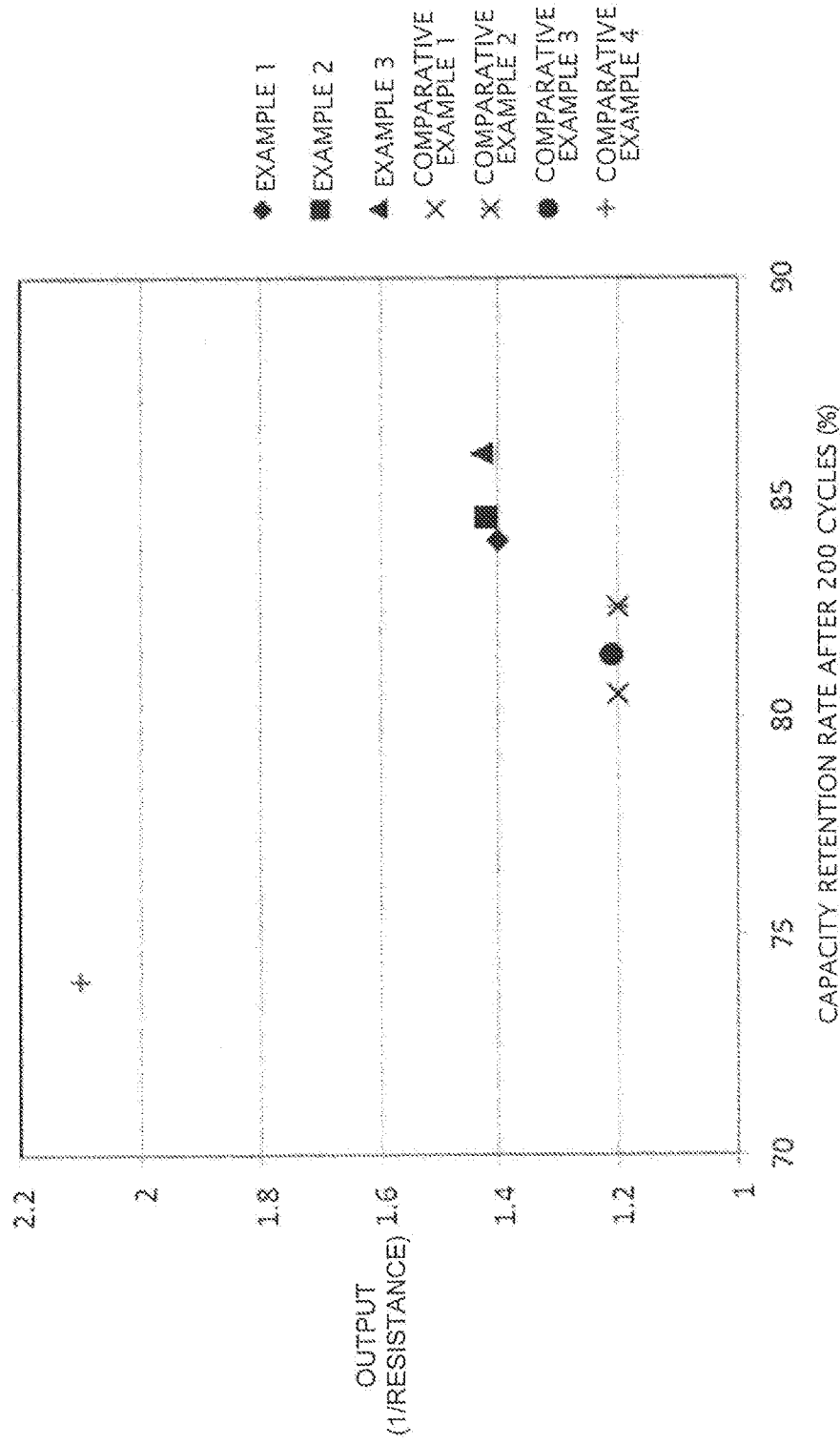
FIG. 5 is a diagram illustrating the capacity retention rate after 200 cycles and the battery output for electrodes obtained in Examples 1 to 3 and Comparative Examples 1 to 4.

As described below, the obtained electrode was evaluated for the capacity retention rate after 200 cycles and the battery output. The evaluation results are shown in FIG. 5.

(Battery Evaluations)
[Capacity Retention Rate]

Using a charge-discharge measurement method, the capacity retention rate (%) after 200 cycles at 60° C. was measured.

[Output]

From an SOC of 60% at 25° C., battery discharge was performed at a current of ⅓ C, 1 C, 3 C or 5 C, and for each current, the voltage after 10 seconds was measured. The slope of the straight line of the resulting I-V characteristics was deemed to represent the resistance value, and the value of (1/resistance value) was calculated as the battery output.

Example 2

In the manner illustrated in FIG. 3, 99 parts by mass of a lithium-nickel-manganese complex oxide ($LiNi_{0.5}Mn_{1.5}O_4$) as a positive electrode active material and 1 part by mass of lithium, phosphate as an additive were used, and the additive was coated onto the surface of the positive electrode active material using a coating treatment device (Nobilta, manufactured by Hosokawa Micron Corporation), thus obtaining a coated active material (the coating treatment step).

Subsequently, a mixture (solid content concentration: 70% by mass) obtained by mixing a solid fraction containing 91 parts by mass of the obtained coated active material, 6 parts by mass of acetylene black as a conductive assistant, and 3 parts by mass of polyvinylidene fluoride (PVDF) as a binder, with N-methyl-2-pyrrolidone (NMP) as a solvent was kneaded and dispersed by a high shear energy (8,000 kJ/L) using a micromixer (Nanovater, manufactured by Yoshida Kikai Co., Ltd.), thus obtaining a positive electrode paste. A positive electrode plate was then obtained in the same manner as Example 1.

The thus obtained electrode was evaluated for the capacity retention rate after 200 cycles and the battery output in the same manner as Example 1. The evaluation results are shown in FIG. 5.

Example 3

In the manner illustrated in FIG. 4, 99.5 parts by mass of a lithium-nickel-manganese complex oxide ($LiNi_{0.5}Mn_{1.5}O_4$) as a positive electrode active material and 0.5 parts by mass of lithium phosphate as an additive were used, and the additive was coated onto the surface of the positive electrode active material using a coating treatment device (Nobilta, manufactured by Hosokawa Micron Corporation), thus obtaining a coated active material.

Subsequently, a mixture (solid content concentration: 70% by mass) obtained by mixing a solid fraction containing 90.5 parts by mass of the obtained coated active material, 6 parts by mass of acetylene black as a conductive assistant, 3 parts by mass of polyvinylidene fluoride (PVDF) as a binder and 0.5 parts by mass of lithium phosphate as an additive, with N-methyl-2-pyrrolidone (NMP) as a solvent was kneaded and dispersed by a high shear energy (8,000 kJ/L) using a micromixer (Nanovater, manufactured by Yoshida Kikai Co., Ltd.), thus obtaining a positive electrode paste. A positive electrode plate was then obtained in the same manner as Example 1.

The thus obtained electrode was evaluated for the capacity retention rate after 200 cycles and the battery output in the same manner as Example 1. The evaluation results are shown in FIG. 5.

Comparative Example 1

With the exception of performing the kneading and dispersion at a low shear energy (500 kJ/L) using a homogenizer (model: T25 Basic S1 ULTRA-TURRAX, manufactured by IKA Works, Inc.) instead of the micromixer as the kneading device, a positive electrode paste was obtained in the same manner as Example 1. A positive electrode plate was then obtained in the same manner as Example 1.

The thus obtained electrode was evaluated for the capacity retention rate after 200 cycles and the battery output in the same manner as Example 1. The evaluation results are shown in FIG. 5.

Comparative Example 2

With the exception of performing the kneading and dispersion at a low shear energy (500 kJ/L) using the homogenizer instead of the micromixer as the kneading device, a positive electrode paste was obtained in the same manner as Example 2. A positive electrode plate was then obtained in the same manner as Example 1.

The thus obtained electrode was evaluated for the capacity retention rate after 200 cycles and the battery output in the same manner as Example 1. The evaluation results are shown in FIG. 5.

Comparative Example 3

With the exception of performing the kneading and dispersion at a low shear energy (500 kJ/L) using the homogenizer instead of the micromixer as the kneading device, a positive electrode paste was obtained in the same manner as Example 3. A positive electrode plate was then obtained in the same manner as Example 1.

The thus obtained electrode was evaluated for the capacity retention rate after 200 cycles and the battery output in the same manner as Example 1. The evaluation results are shown in FIG. 5.

Comparative Example 4

With the exception of not adding lithium phosphate as an additive, a positive electrode paste was obtained in the same manner as Comparative Example 1. A positive electrode plate was then obtained in the same manner as Example 1.

The thus obtained electrode was evaluated for the capacity retention rate after 200 cycles and the battery output in the same manner as Example 1. The evaluation results are shown in FIG. 5.

In the electrode that did not contain lithium phosphate (Comparative Example 4), decomposition of the electrolyte proceeded readily, and therefore the capacity retention rate was 74%, the lowest among Examples 1 to 3 and Comparative Examples 1 to 4. On the other hand, because the electrode lacked lithium phosphate, which functions as a resistance component, the output (evaluated in FIG. 5 as the inverse of the resistance value) was 2.1, the highest among all of the electrodes.

In contrast, the electrodes that contained lithium phosphate (Examples 1 to 3, Comparative Examples 1 to 3) exhibited improved capacity retention rates compared with the electrode that did not contain lithium phosphate (Comparative Example 4) due to the suppression of decomposition of the electrolyte. Comparing the treatment methods, the capacity retention rates were from 80 to 83% for a typical dispersion treatment (Comparative Examples 1 to 3), but in Examples 1 to 3, in which a high dispersion treatment was performed, the capacity retention rates reached 84 to 86%, with an improvement in the capacity retention rate of a little less than 5% as a result of altering the dispersion method.

Further, in terms of the output, including lithium phosphate caused an increase in the resistance and a significant decrease in the output, but whereas the output was about 1.2 for the typical dispersion treatment (Comparative Examples 1 to 3), the output increased to about 1.4 for the high dispersion treatment (Examples 1 to 3), an improvement of nearly 20%.

Further, the electrode which exhibited the most superior performance was the electrode in which an active material coated with 0.5% by mass of lithium phosphate was mixed with the remaining 0.5% by mass of lithium phosphate and then subjected to a high dispersion treatment (Example 3), and this electrode had a capacity retention rate of 86% and an output of 1.43. It is thought that the reasons that this treatment method yielded the highest level of performance are that if the entire 1% by mass of the lithium phosphate is coated onto the active material as in Example 2, then the lithium phosphate acts as a resistance component that inhibits the lithium ion insertion and removal reactions, whereas if the entire 1% by mass of the lithium phosphate is added (blended) to the mixture as in Example 1, then the lithium phosphate is arranged in locations that are unable to contribute to the reactions other than at the surface of the active material. In other words, it is surmised that by splitting the timing of the addition of the lithium phosphate, and performing a high dispersion treatment, the lithium phosphate is dispersed with a good balance between the active material surface and the active material interior, thus resulting in the best performance.

Example 4

Mixtures obtained by mixing a solid fraction containing 90 parts by mass of a lithium-nickel-manganese complex oxide ($LiNi_{0.5}Mn_{1.5}O_4$) as a positive electrode active material, 6 parts by mass of acetylene black as a conductive assistant, 3 parts by mass of polyvinylidene fluoride (PVDF) as a binder and 1 part by mass of lithium phosphate as an additive, with N-methyl-2-pyrrolidone (NMP) as a solvent were mixed to achieve solid content concentrations of 69% by mass, 70% by mass and 72% by mass respectively, and each mixture was kneaded and dispersed by a high shear energy (8,000 kJ/L) using a micromixer (Nanovater, manufactured by Yoshida Kikai Co., Ltd.) to obtain a positive electrode paste.

[Viscosity Measurement]

Figure 6:
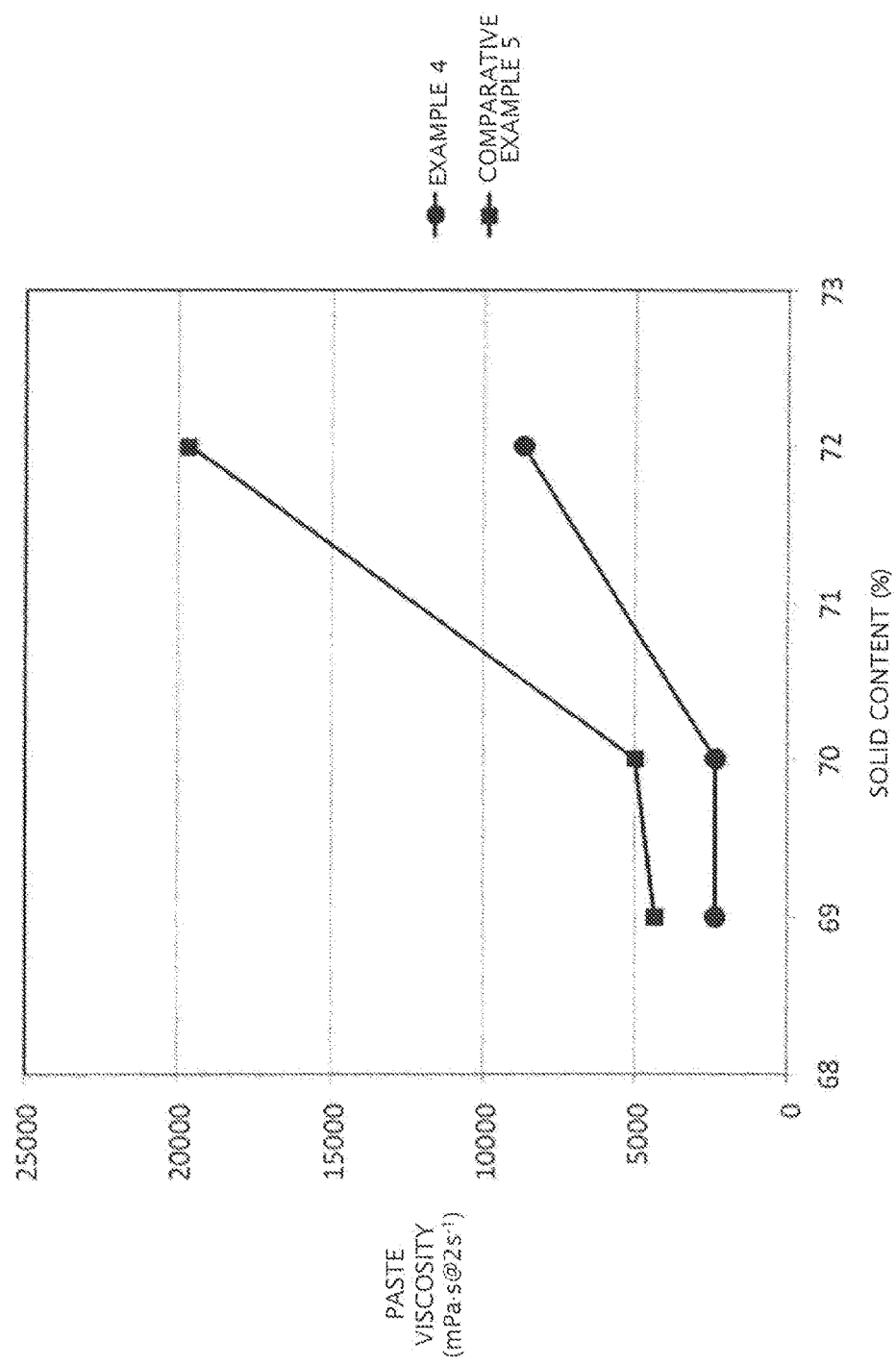
FIG. 6 is a diagram illustrating the solid content and the paste viscosity of electrode pastes obtained in Example 4 and Comparative Example 5.

Using a viscometer, (model: RE105H, manufactured by Toki Sangyo Co., Ltd.), the viscosity (mPa·s@2s$^{-1}$) of each electrode paste was measured under temperature conditions of 30° C. The results are shown in FIG. 6.

Comparative Example 5

With the exception of performing the kneading and dispersion at a low shear energy (500 kJ/L) using a homogenizer (model: T25 Basic S1 ULTRA-TURRAX, manufactured by IKA Works, Inc.) instead of the micromixer as the kneading device, positive electrode pastes having solid content concentrations of 69% by mass, 70% by mass and 72% by mass respectively were obtained in the same manner as Example 1. The viscosity of each positive electrode paste was measured in the same manner as Example 4. The results are shown in FIG. 6.

In this manner, low-viscosity electrode pastes were able to be produced which were able to be readily applied even when the paste had a high solid content concentration such as a concentration exceeding 65% by mass. It is thought that by using a high dispersion treatment that is capable of imparting a much higher shear energy than typical dispersion methods, cohesion of additives such as lithium phosphate and the positive electrode active material and the like can be loosened, enabling the preparation of an electrode paste that is substantially uniformly dispersed. In terms of the shear energy imparted during the treatment, whereas a typical conventional kneading device imparts about 500 kJ/L, a high dispersion treatment using a micromixer is able to impart a shear energy of 8,000 kJ/L or more.

The above results confirmed that by performing a micromixing treatment in which a mixture of a solid fraction containing an active material blended at a high solid content concentration and a solvent is kneaded using a micromixer, a low-viscosity electrode paste could be produced which was able to be readily applied even when the paste had a high solid content concentration such as a concentration exceeding 65% by mass. Further, it was also evident that by using this method, the battery performance could be improved even if the amount added of the additive was the same. It is surmised that this is because the additive can be dispersed substantially uniformly within the electrode. Further, by using this method, the amount added of the additive can be reduced, and oxidative decomposition of the electrolyte can be suppressed using the minimum required amount of the additive, thus enabling a combination of improved battery cycle characteristics and improved output to be achieved.

REFERENCE SIGNS LIST

10: Micromixer
12: Kneading unit
14: Mixing tank
16: Pump
18: Coating treatment device

The invention claimed is:

1. A production method for an electrode paste comprising an active material and a solvent,
   the production method comprising a micromixing treatment step in which a mixture of a solid fraction containing the active material blended at a high solid content concentration and the solvent is kneaded using a micromixer, wherein
   the solid content concentration of the mixture exceeds 65% by mass, and
   the micromixer is a kneading device that feeds a slurry into a nozzle portion by a pump, and that performs kneading with a shear energy from not less than 4,000 kJ/L to not more than 16,000 kJ/L which is generated as the slurry passes through the nozzle portion, wherein a diameter of the nozzle portion for the kneading is at a microscale level from 30 μm to 100 μm.

2. The production method for an electrode paste according to claim 1, wherein the production method further comprises a coating treatment step of coating the active material with an additive prior to the micromixing treatment step.

3. The production method for an electrode paste according to claim 1, wherein an additive is added and kneaded in the micromixing treatment step.

4. The production method for an electrode paste according to claim 1, wherein
the active material comprises a lithium-nickel-manganese complex oxide, and
the electrode paste also comprises a substance having lithium ion conductivity as an additive.

* * * * *